Jan. 5, 1960     T. J. SIEVERT     2,919,728
LUMBER HANDLING DEVICES
Filed May 16, 1958     2 Sheets-Sheet 2

INVENTOR.
Theodore J. Sievert
BY Nathan H. Kraus
Frank H. Marks
Attorneys

United States Patent Office 2,919,728
Patented Jan. 5, 1960

2,919,728

LUMBER HANDLING DEVICES

Theodore J. Sievert, Naperville, Ill., assignor to Kroehler Mfg. Co., Naperville, Ill., a corporation of Illinois Application May 16, 1958, Serial No. 735,723

3 Claims. (Cl. 143—157)

My invention relates to improvements in lumber handling devices intended for use in connection with a sawing apparatus wherein lumber stock or other materials are reduced to smaller sections by repeated passages through a saw.

The principal object of my invention is the provision of a device of the foregoing character for automatically separating cut or ripsawed portions from a board after each sawing operation, conveying such portions to a point of storage or use, and returning the balance of the board to within easy reach of the operator for further passes through the saw.

Another object of my invention is the provision of an apparatus of the foregoing character which is simple in construction, durable in service, and efficient in operation.

Other and further objects and advantages of my invention will become apparent from the following description when considered in connection with the accompanying drawings in which Fig. 1 is a perspective view of a device in accordance with my invention, the same being illustrated in combination with a travelling-bed circular saw;

Figure 2:
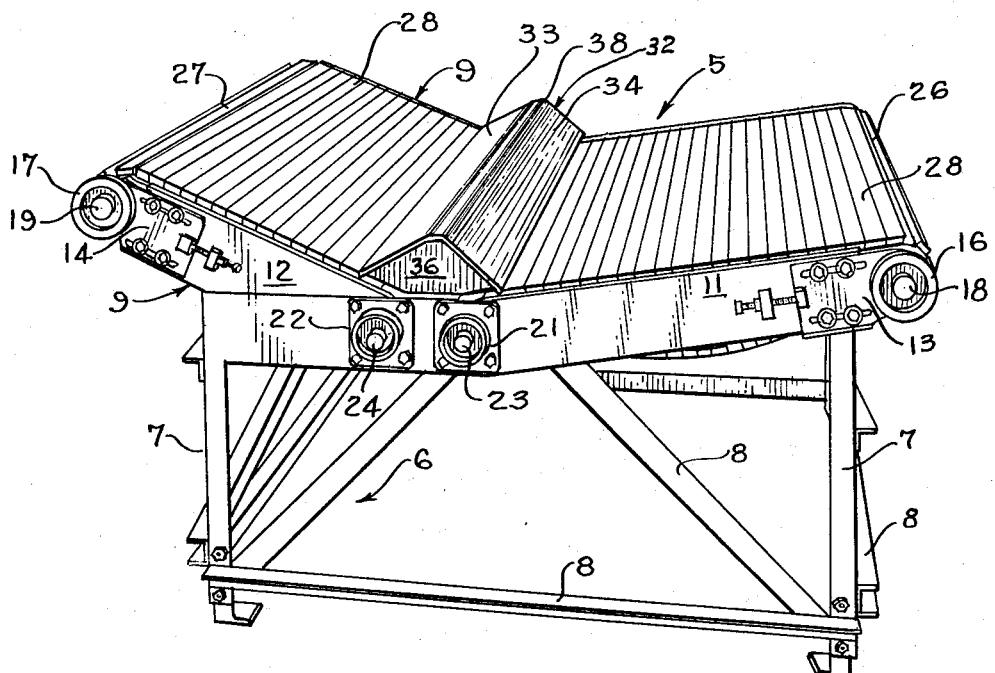
Fig. 2 is a front perspective view of the device illustrated in Fig. 1.

Referring to the drawings, the numeral 5 designates generally my invention which comprises a supporting frame structure 6 formed of suitable angle iron members and including upright legs 7 held in rigid parallel relationship by a plurality of bracing members 8. Included in the frame 6 is a pair of opposed side channel members 9 in transverse alignment, each being shaped substantially as illustrated in Fig. 2. As will be observed, each of the side members 9 includes two integral arms 11 and 12 arranged in angular relationship to each other, as illustrated. Supported for longitudinal adjustment at the outer ends of the arms 11 and 12 are plates 13 and 14 carrying roller-bearing assemblies 16 and 17 respectively. Journaled in opposed bearing assemblies 16, 16 and 17, 17 which are, of course, coaxially aligned are transverse shafts 18 and 19 respectively. At the inner ends of the arms 11 and 12 in close proximity to the juncture thereof are bearing assemblies 21 and 22 in which are journaled transverse shafts 23 and 24 respectively.

Endless conveyor webs 26 and 27 are suitably supported on shafts 18, 23 and 19, 24 respectively. The said webs consist of parallel transverse wooden slats 28 secured to longitudinally extending endless belts 29 and are suitably driven by conventional means generally indicated by the numeral 31. The upper reaches of each of the webs travel in an outward direction so as to convey any articles carried thereon upwardly to the ends of said reaches whereupon said articles may fall on conveyors, as will be hereinafter described.

Disposed at the juncture of the arms 11 and 12 and extending fully transversely of the frame is a separating or deflecting member 32 comprised of two plates 33 and 34 joined in angular relation with the apex uppermost. The said member is elevated slightly above the conveyor webs 26 and 27 for the purpose of clearance and is supported at its ends by brackets 36 suitably supported on the arms 11 and 12 at the juncture thereof.

Figure 1:
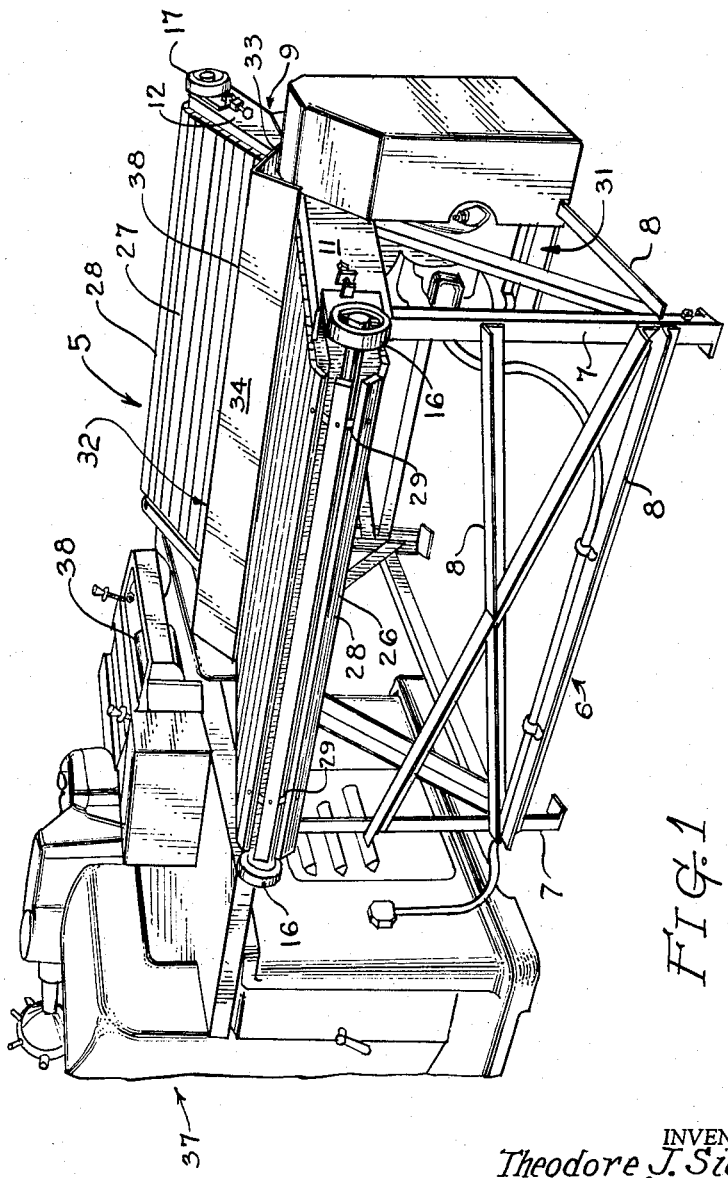

The structure just described which comprises my invention is used in connection with a conventional sawing machine of any suitable type. One such machine is illustrated in Fig. 1 and is a travelling-bed circular saw 37 provided with driven corrugated hold-down rollers 38 cooperating with the travelling-bed for feeding the boards into the saw blade. The foregoing construction is well known and needs no further description.

The structure 5 of my invention is juxtaposed in relation to the saw 37 so that the apex 38 of the deflecting member 32 is in vertical alignment with the plane of the saw blade and in horizontal alignment with the plane of the saw table or slightly below the same.

Figure 3:
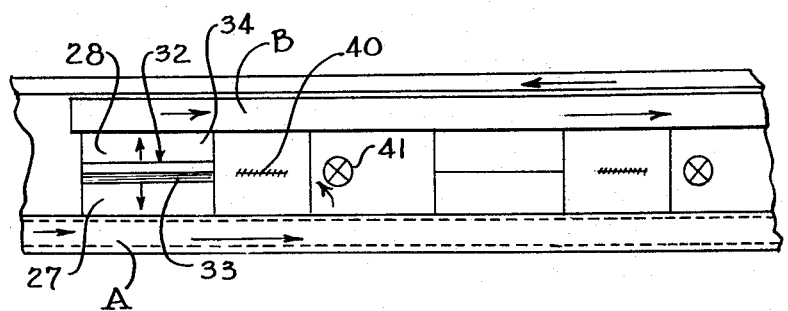
Fig. 3 is a flow diagram showing the use of my invention in combination with a saw and conveying apparatus.

As illustrated in Fig. 3, conveyor beds A and B are arranged alongside respective ends of the upper reaches of the webs 26 and 27 so that any articles carried on said webs are delivered to the conveyor beds which travel in the directions indicated by the arrows.

The operation of my invention is easily understood.

Referring to the flow diagram illustrated in Fig. 3, lumber stock in the form of flat boards is fed against the saw blade 40 by the operator indicated by the numeral 41. The travelling-bed and hold-down rollers of the saw take effect to draw the stock into the saw blade and onto the separating members 32. In feeding the stock to the saw, the operator is careful to position it so that the part to be returned for resawing will be on the side of web 27 which communicates with conveyor bed A, and the part not to be returned is on the side of web 28 which communicates with conveyor bed B.

As the lumber stock advances after cutting, the kerf of the stock is directly in vertical alignment with the apex 38 of the member 32. As the trailing end of the stock is discharged from the saw, the stock will drop down onto the separating member 32 with the part to be returned for resawing contacting plate 33 while the sawed off part contacts plate 34. Both parts will slide down the respective inclined plates of member 32 and will drop on respective webs which will convey the parts outwardly. The part to be returned for resawing is transferred to conveyor bed A and will travel in the direction of the arrow in close proximity to the operator's station where it may be picked up by the operator and run through the saw again, repeating the process until the complete stock has been cut to desired widths. Correspondingly, the sawed off part is transferred to conveyor bed B and conducted to a point of use or storage.

Various changes coming within the spirit of my invention may suggest themselves to those skilled in the art. Hence, I do not wish to be limited to the specific embodiments shown and described or uses mentioned, but intend the same to be merely exemplary, the scope of my invention being limited only by the appended claims.

I claim:

1. In combination with a vertically disposed saw having a portion projecting above a table, a separating member positioned in close proximity to and longitudinally of said saw, said separating member including two elongated plate members arranged in oppositely downwardly inclined relationship with the upper edges of said plate members being substantially contiguous and substantially in the vertical plane of said saw, and in the horizontal plane of said table, an endless conveyor arranged adjacent the lower edge of each of said plates, the upper reaches of each of said conveyors travelling outwardly in a direction away from said separating member, said separating member directing sawed lumber pieces from said saw onto respective conveyors.

2. The invention as defined in claim 1 in which the upper reaches of said endless conveyors travel in an upwardly inclined plane.

3. In combination with a vertically disposed saw having a portion projecting above a table, a separating member positioned in close proximity to and longitudinally of said saw, said separating member having opposite outwardly and downwardly directed surfaces, the upper edges of each of said surfaces being substantially contiguous and substantially in the vertical plane of said saw and in the horizontal plane of said table, an endless conveyor arranged adjacent the lower edge of each of said surfaces, the upper reaches of each of said conveyors travelling outwardly in a direction away from said separating member, said separating member directing sawed lumber pieces from said saw onto respective endless conveyors, and conveyor means adjacent each of said first mentioned conveyors to receive sawed lumber pieces therefrom.

References Cited in the file of this patent

UNITED STATES PATENTS

| | | |
|---|---|---|
| 782,088 | Ward | Feb. 7, 1905 |
| 1,075,918 | Kaylor | Oct. 14, 1913 |
| 1,803,857 | Lumb | May 5, 1931 |
| 1,867,873 | Browne | July 19, 1932 |
| 2,434,411 | Johnson | Jan. 13, 1948 |
| 2,671,568 | Rundt | Mar. 9, 1954 |